(12) United States Patent
Shang

(10) Patent No.: US 12,190,103 B2
(45) Date of Patent: Jan. 7, 2025

(54) PROJECT VISUALIZATIONS

(71) Applicants: MICRO FOCUS LLC, Santa Clara, CA (US); Er-Xin Shang, Shanghai (CN)

(72) Inventor: Er-Xin Shang, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 345 days.

(21) Appl. No.: 17/056,604

(22) PCT Filed: Jun. 11, 2018

(86) PCT No.: PCT/CN2018/090645
§ 371 (c)(1),
(2) Date: Nov. 18, 2020

(87) PCT Pub. No.: WO2019/237226
PCT Pub. Date: Dec. 19, 2019

(65) Prior Publication Data
US 2021/0232386 A1 Jul. 29, 2021

(51) Int. Cl.
*G06F 8/70* (2018.01)
*G06F 9/50* (2006.01)
*G06F 11/07* (2006.01)
*G06Q 10/0631* (2023.01)
*G06Q 10/0633* (2023.01)

(52) U.S. Cl.
CPC ............... *G06F 8/70* (2013.01); *G06F 9/505* (2013.01); *G06F 11/0793* (2013.01); *G06Q 10/06313* (2013.01); *G06Q 10/0633* (2013.01)

(58) Field of Classification Search
CPC .................................................. G06Q 10/0633
See application file for complete search history.

(56) References Cited

U.S. PATENT DOCUMENTS 9,372,670 B1 6/2016 Cartey
9,471,468 B2 10/2016 Broomhall
9,836,183 B1 12/2017 Love
(Continued)

FOREIGN PATENT DOCUMENTS

CN 106599327 4/2017

OTHER PUBLICATIONS

Wong, A Novel Visualization Technique for Electric Power Grid Analytics, 2009, IEEE, vol. 15, No. 3 (Year: 2009).*
(Continued)

*Primary Examiner* — Rutao Wu
*Assistant Examiner* — Zahra Elkassabgi
(74) *Attorney, Agent, or Firm* — Sheridan Ross P.C.

(57) ABSTRACT

In some examples, a system represents tasks of a project as feature nodes of a force-directed graph, and connects, in the force-directed graph, sub-feature nodes representing sub-features associated by links to the feature nodes in the force-directed graph. The system sets a size of each respective sub-feature node of the sub-feature nodes based on an amount of resource usage expended on a respective sub-feature represented by the respective sub-feature node. The system causes display of the force-directed graph, and collapses or expands a portion of the force-directed graph responsive to user interaction with the force-directed graph.

18 Claims, 7 Drawing Sheets

(56) References Cited

U.S. PATENT DOCUMENTS

| | | | |
|---|---|---|---|
| 2007/0118839 A1* | 5/2007 | Berstis | G06F 9/5072 |
| | | | 718/105 |
| 2011/0093852 A1* | 4/2011 | Li | G06F 11/3404 |
| | | | 718/100 |
| 2013/0117075 A1 | 5/2013 | Brown | |
| 2013/0232433 A1 | 9/2013 | Krajec | |
| 2019/0196672 A1* | 6/2019 | Mikheev | G06Q 10/06 |

OTHER PUBLICATIONS

Data Visualization, 2021, University of Toronto, Section 10 (Year: 2021).*

Gephi, Tutorial, 2010, all pages. (Year: 2010).*

Arleo, et al; A Distributed Force-Directed Algorithm on Giraph: Design and Experiments; arXiv:1606.02162v1 [cs.DS]; 25 pages; Jun. 7, 2016.

Author Unknown; A Petablox Project: Tasks, Targets and Dependencies; Petablox-project; Edited page Apr. 21, 2016—5 Revisions; 3 pages; Feb. 16, 2018.

Author Unknown; COMPSCI 242-001 Data Structures and Algorithms (Fall 2005); Lab Assignment #4; Critical Path Analysis; 3 pages; Dec. 15, 2005.

Zwischenzugs; Project Management as Code with Graphviz; https://zwischenzugs.com/2017/12/18/project-management-as-code-with-graphviz/; 16 pages; Feb. 16, 2018.

International Search Report/Written Opinion; PCT/CN2018/090645; Mailed Mar. 18, 2019; 9 Pages.

* cited by examiner

PROJECT VISUALIZATIONS

BACKGROUND

Project management involves managing various aspects of a project, such as a project to develop machines and/or programs, a project to manage an information technology (IT) infrastructure, and so forth. If a project is relatively complex and includes many tasks, then managing such a project can be challenging.

BRIEF DESCRIPTION OF THE DRAWINGS

Some implementations of the present disclosure are described with respect to the following figures.

Figure 1:
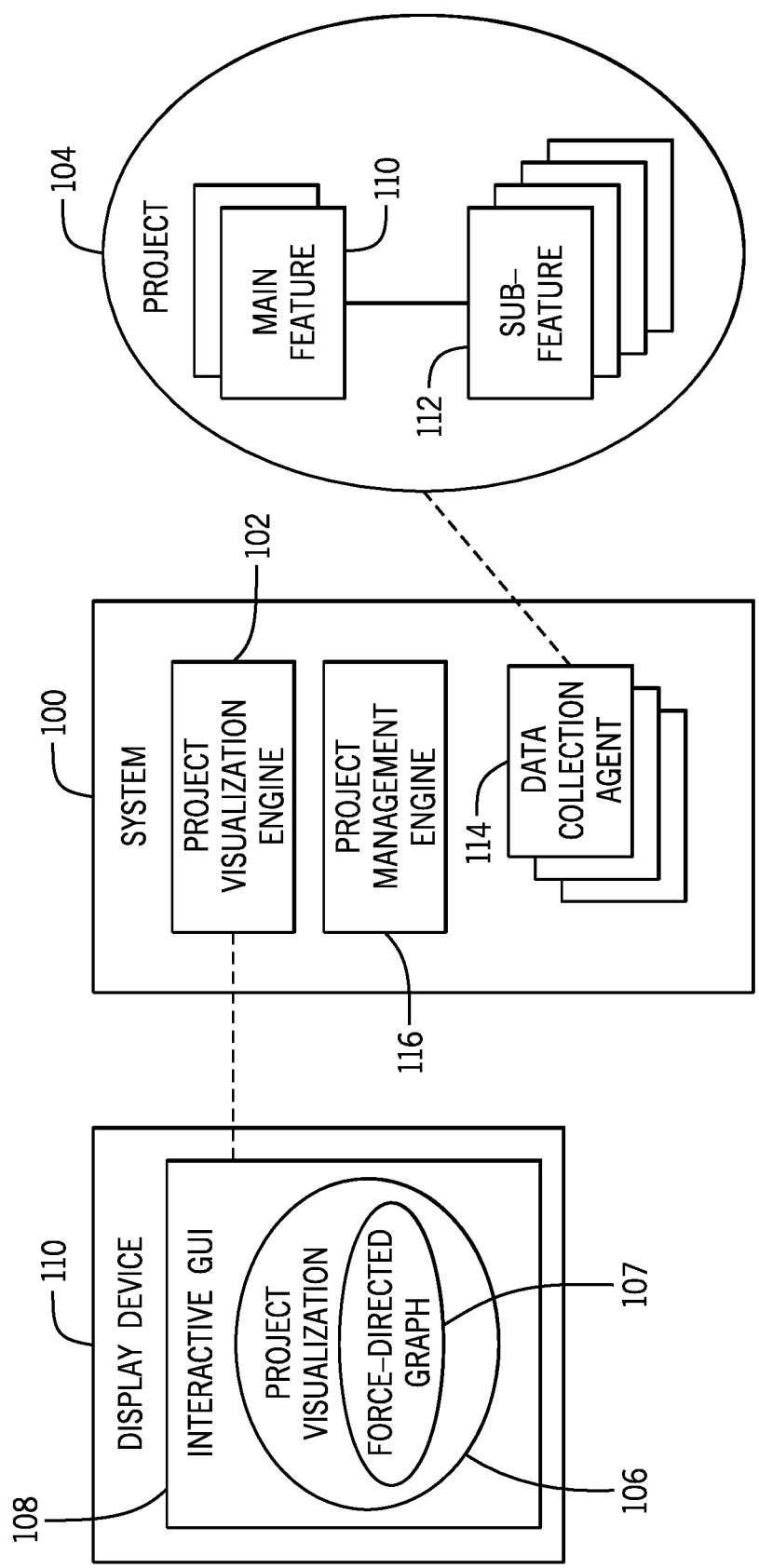
FIG. 1 is a block diagram of an arrangement that includes a system with a project visualization engine 102 according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A project can refer to any collection of activities for achieving a target goal. For example, a project can develop and manufacture a machine, such as a computer, a smartphone, a game appliance, a wearable device (e.g., a smart watch, smart eyeglasses, a head-mounted device, etc.), a storage system, a communications system, a vehicle, an Internet-of-Things (IoT) device, and so forth. As a further example, a project can develop a program, which includes machine-readable instructions (such as software and/or firmware). In other examples, a project can manage an operation of an information technology (IT) infrastructure that includes a network of machines, programs, and other entities. Managing the operation of an IT infrastructure can include monitoring for faults or errors in the IT infrastructure and taking actions to address the faults or errors, updating machines and/or programs, or any other activities that relates to the IT infrastructure.

Although specific examples of projects are provided above, other examples of projects can be involved in other scenarios.

A project can include various features. Main features of a project can include tasks of the project, where each task includes an action or a collection of actions to be performed for the project. For example, to develop a machine or program, tasks of the project can include the following: designing the machine or program, testing the machine or program, identifying a defect of the machine or program, creating a patch to address a defect of the machine or program, and so forth. As another example, a project to manage an IT infrastructure can include the following tasks: monitor an operation of a portion or an entirety of the IT infrastructure, identify a fault or error in the IT infrastructure, identify a fix for the fault or error, deploying the fix for the fault or error in the IT infrastructure, and so forth.

In other types of projects, the tasks of the projects are different.

Each feature, such as a task, can in turn be associated with sub-features. For example, a task can be associated with any or some combination of the following sub-features: a test (for testing an aspect of the project), information pertaining to a defect, a patch for remediating the defect, and so forth. A sub-feature can further be associated with additional sub-features.

In accordance with some implementations of the present disclosure, improved visualizations of projects are provided. The visualizations of features of projects can be provided in interactive graphical user interfaces (GUIs) that improve management of projects, such as projects for developing machines, developing programs, managing IT infrastructures, and so forth. By being able to improve the management of projects, improvements in features of the projects or the targets of the projects (such as machines, programs, IT infrastructures, etc.) can be achieved. For example, more effective project management allows for more effective allocation of resources in the project, such as resources for developing machines or programs, resources for managing IT infrastructures, and so forth. Resources can include human resources (e.g., persons allocated to develop or test machines or programs), processing resources (e.g., processors allocated to manage a project), storage resources (e.g., memory or storage allocated to store information for the project), communication resources (e.g., a communication bandwidth allocated to communicate information of the project), and so forth.

By using interactive GUIs to display visualizations to allow for more effective management of projects, the machines or programs that are developed can function more effectively (such as with less bugs since more effective allocations are provided in the development of the machines or programs), or the development of machines or programs can be achieved in a more timely fashion. As another example in the IT infrastructure management context, more effective allocation of resources can lead reduced downtime of an IT infrastructure (or a portion of the IT infrastructure) due to errors or faults in the IT infrastructure.

FIG. 1 is a block diagram of an example arrangement that includes a system 100 according to some implementations. The system 100 can be implemented using a computer or an arrangement of multiple computers.

The system 100 includes a project visualization engine 102 that is used for visualizing features of a project 104. As used here, an "engine" can refer to a hardware processing circuit, such as any or some combination of a microprocessor, a core of a multi-core microprocessor, a microcontroller, a programmable integrated circuit device, a programmable gate array, or another hardware processing circuit. As further examples, an "engine" can refer to a combination of a hardware processing circuit and machine-readable instructions executable on the hardware processing circuit.

The project visualization engine 102 causes display of a project visualization 106 that displays information relating to features of the project 104. The project visualization 106 is displayed in an interactive GUI 108 that is displayed by a display device 110 associated with the system 100. The display device 110 can be part of the system 100, or alternatively, the display device 110 can be part of an electronic device that is communicatively connected to the system 100 over a network or other type of link (either a wireless network or link or a wired network or link).

The project visualization 106 includes a force-directed graph 107 that includes nodes representing features of the project 106. A force-directed graph is a graph that depicts target information in which distances between nodes of the graph are adjusted to achieve an aesthetic pleasing presentation. The force-directed graph includes nodes having positions arranged in a two-dimensional (2D) or three-dimensional (3D) space so that links between nodes are of similar length and the number of links that cross each other is reduced. Forces can be applied to the nodes of the force-directed graph, pulling them closer together or pushing the nodes farther apart. The pulling together of nodes or pushing apart of nodes can be iteratively updated until the overall arrangement of nodes of the force-directed graph achieves equilibrium with respect to the forces applied to the nodes.

As depicted in FIG. 1, the features of the project 104 include main features 110 and sub-features 112. A main feature 110 can be associated with a sub-feature or a number of sub-features. For example, a main feature 110 can represent a task of the project 104. Sub-features of the project 104 can include different aspects associated with the task, including, as examples, any or some combination of: a test for testing an aspect of the project 104, a defect identified by the test, a patch used to remediate the defect, and so forth.

Although not shown in FIG. 1, it is noted that a given sub-feature 112 can in turn be associated with further sub-features of the given sub-feature.

The system 100 further includes data collection agents 114, which can be used to collect data associated with the features (110, 112) of the project 104. The data collection agents 114 can be implemented with hardware data collectors and/or machine-readable instructions.

As examples, a data collection agent 114 can collect information relating to resource usage of a feature of the project 104. For example, the data collection agent 114 can collect information regarding an amount of time expended by a human (or multiple humans) relating to a task or a sub-feature of the project 104. Alternatively, the data collection agent 114 can collect information regarding usage of another resource consumed (amount of a processing resource consumed, amount of a storage resource consumed, an amount of a communication resource consumed, etc.) relating to a task or a sub-feature of the project 104.

In some examples, the system 100 further includes a project management engine 116 that can manage the project 104, such as based on the project visualization 106 displayed in the interactive GUI 108. For example, the project management engine 116 can adjust resource allocation (e.g., increase an allocation of resources or decrease an allocation of resources) to the project 104 based on the project visualization 106. For example, in response to user interaction (e.g., user input) with the interactive GUI 108 that displays the project visualization 106, the project management engine 116 can adjust resource allocation for management of the project 104, where management of the project 104 can include developing a machine, developing a program, or managing an IT infrastructure (such as deploying a fix for a fault or error of a machine or program of the IT infrastructure).

Figure 2:
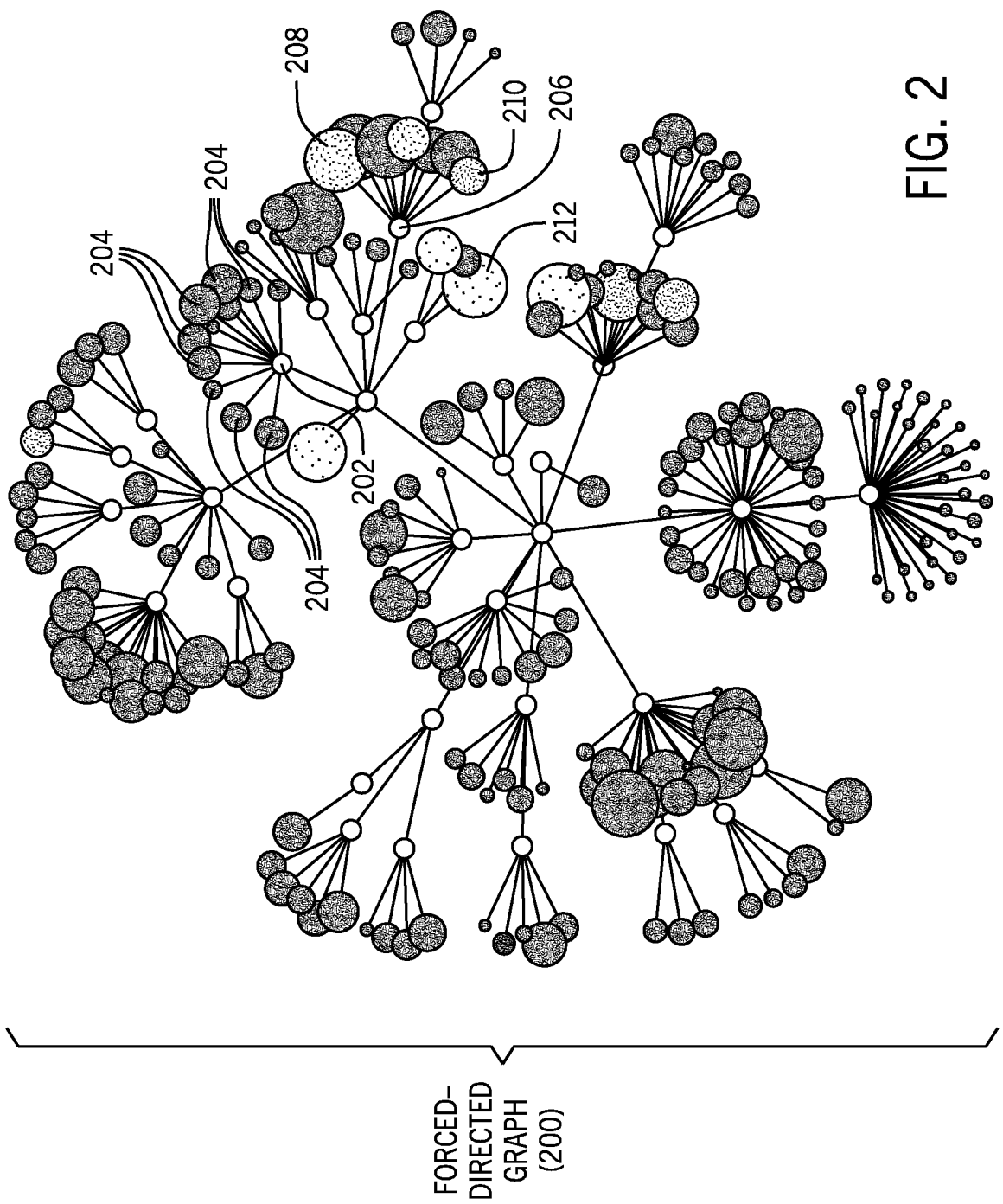
FIGS. 2-4 illustrate force-directed graphs generated according to some examples.

FIG. 2 is a schematic view of an example force-directed graph 200, which is an example of the force-directed graph 108 shown in the project visualization 106 of FIG. 1. Circles in the force-directed graph 200 are nodes of the graph 200, and represent respective features of a project, such as the project 104 of FIG. 1. Some of the nodes of the force-directed graph 200 represent main features 110, while other nodes of the force-directed graph 200 represent sub-features 112. For example, node 202 represents a main feature, such as a task of the project 104. The nodes 204 that are connected by links to the main feature node 202 represent sub-features of the main feature, such as sub-features of the task represented by the node 202.

Node 206 represents another task of the project 104, and nodes connected by links to the node 206 represents sub-features.

In some examples, if a given node represents a test, then a color of the given node can represent a status of the test. For example, a node (e.g., 208) assigned a first color (e.g., green), can represent that a test has successfully passed, a node (e.g., 210) assigned a second color (e.g., red) can indicate a failed test, and a node (e.g., 212) assigned a third color can indicate that the test has been suspended.

Similarly, if a node represents presence of a defect, then a first color (e.g., green) can indicate that a defect is not present, while a second color (e.g., red), can indicate that a defect is present.

In some examples, the size of each sub-feature node represents the amount of resource usage for the corresponding represented sub-feature. For example, if a sub-feature node represents a test, then the size of the sub-feature node represents the amount of resource used in performing the test. The resource usage can represent the amount of time spent by an entity in performing the test, where the entity can be a human, a machine, or a program. In other examples, other resource usages can be represented by the size of a sub-feature node 204, such as an amount of memory used, an amount of a processing resource used, an amount of a communication bandwidth used, and so forth.

As noted above, resource usage information can be collected by the data collection agents 114 of FIG. 1.

In the example of FIG. 2, the size of the sub-feature node 208 is larger than the size of the sub-feature node 210, which indicates that more resource usage was expended in performing the test represented by the sub-feature node 208 than in performing the test represented by the sub-feature node 210.

Figure 3:
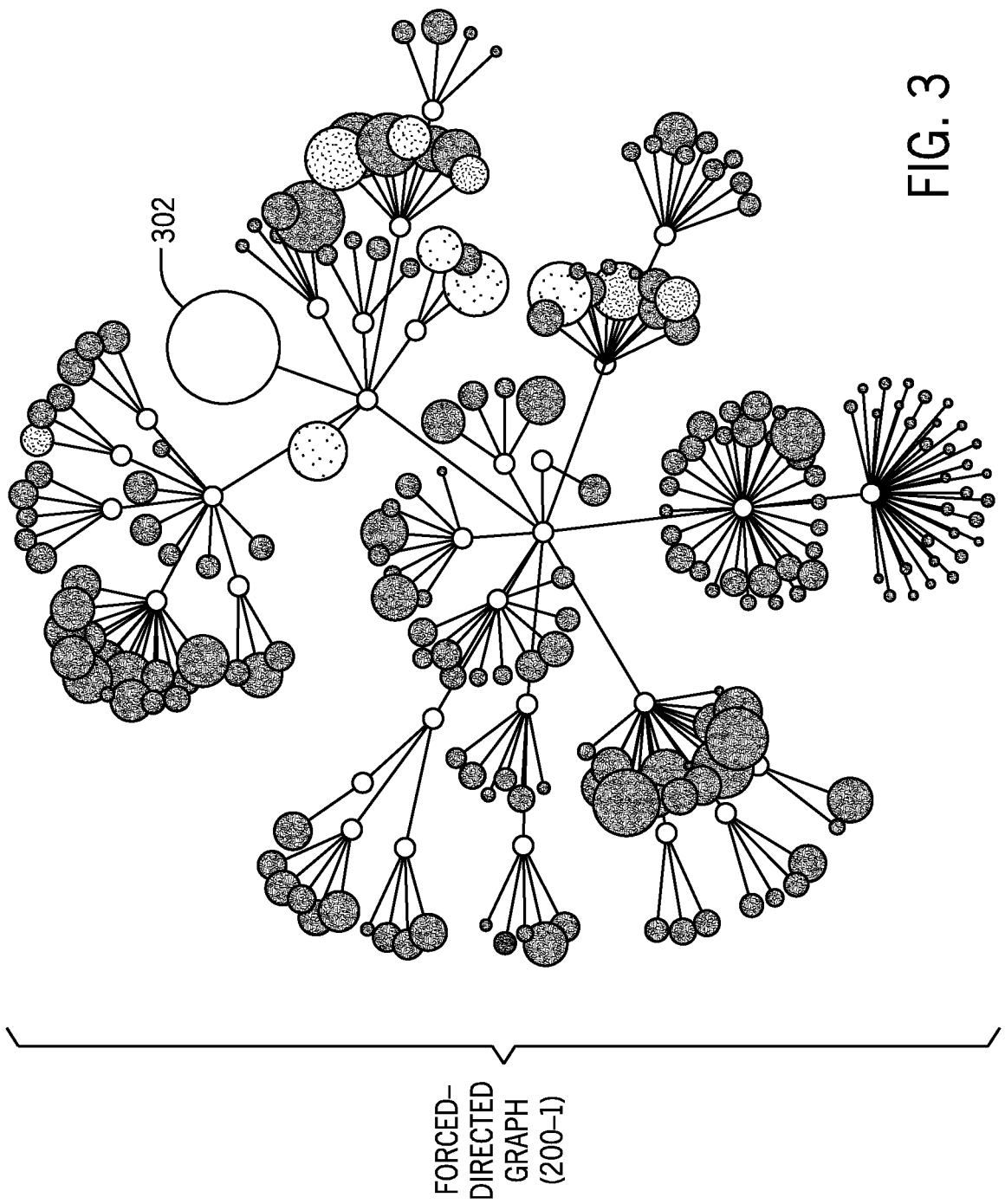

The force-directed graph 200 is user interactive in that a user can interact with the force-directed graph 200. For example, a user can select a main feature node for collapsing. Collapsing a main feature node causes the sub-feature nodes to be combined with the main feature node into a collapsed node. For example, as shown in FIG. 3, a user can select the main feature node 202 (such as by clicking on an input device when a displayed cursor is over the main feature node 202, by using a finger or a stylus to touch a location on a touchscreen corresponding to the main feature node 202, selecting a control item such as a menu item of a control menu in the interactive GUI 108, etc.). Selecting the main feature node 202 for collapse causes the nodes 202 and 204 to be combined and represented as a collapsed node 302 in a modified force-directed graph 200-1.

The size of the collapsed node 302 represents the overall resource usage corresponding to the sub-feature nodes 204 that have been combined into the collapsed node 302. The overall resource usage corresponding to the sub-feature nodes 204 can be a sum (or other mathematical aggregate) of the individual resource usage amounts relating to sub-features represented by the sub-feature nodes 204. For example, the overall resource usage corresponding to the sub-feature nodes 204 can be a sum of the number of personnel hours expended by persons in performing the sub-features.

Figure 4:
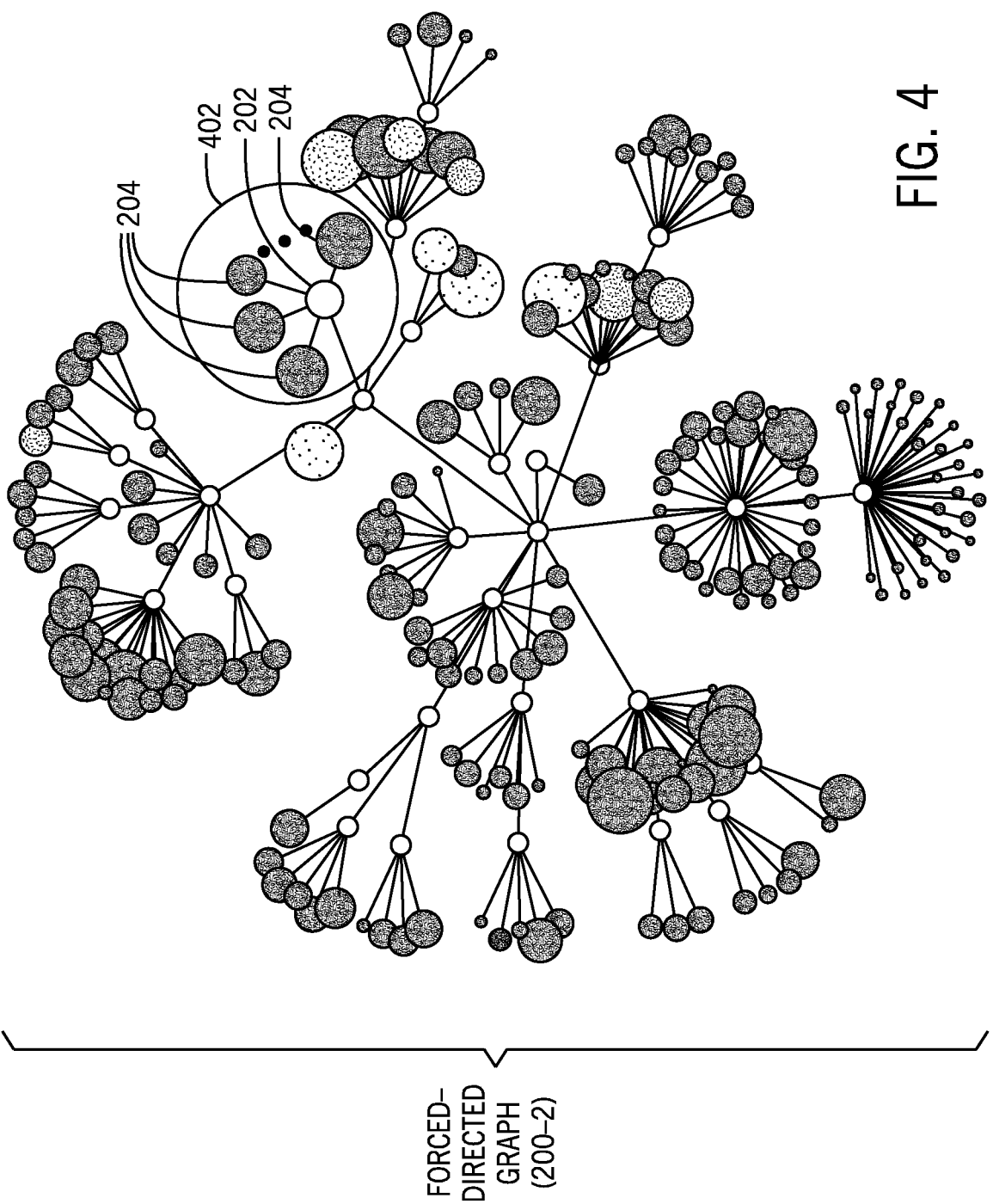

A user can also interact with the force-directed graph 200 of FIG. 2 to amplify a view of a portion of the force-directed graph 200. For example, as shown in FIG. 4, a user has selected the main feature node 202 for amplification. This causes an amplified view 402 of the main feature node 202 and its connected sub-feature nodes 204. The amplified view 402 enlarges the nodes 202 and 204 relative to the nodes 202 and 204 in FIG. 2. The amplified view 402 can also be referred to as a fisheye amplified view.

In further examples, a force-directed graph can be animated. Historical information relating to main tasks and sub-features of the project 104 can be maintained by the project visualization engine 102 of FIG. 1. In response to a request by a user (such as based on selection of a portion of the displayed force-directed graph or selection of a control item in the interactive GUI 108), the entire force-directed graph or the portion of the force-directed graph can be animated. Animation of the force-directed graph can include growing the force-directed graph (or a portion of the force-directed graph) from an initial state to a current state, based on the historical information. The animation can include growing the size of sub-feature nodes as resource usage consumed by the sub-features represented by the sub-feature nodes increases. The animation can also include moving the nodes of the force-directed graph relative to one another as sizes of nodes increase and as the number of nodes change.

Figure 5:
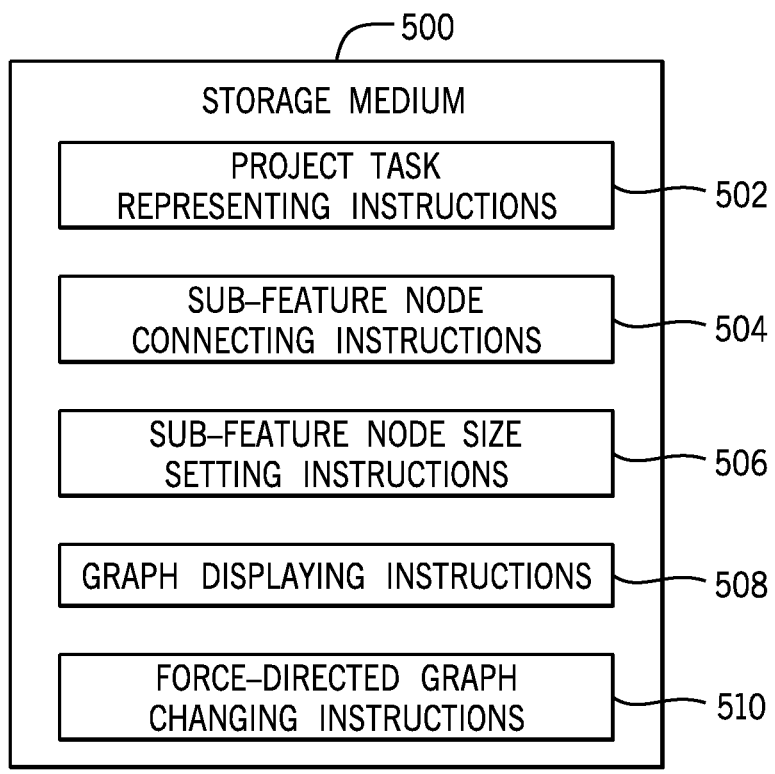
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system to perform various tasks. The machine-readable instructions include project task representing instructions 502 to represent tasks of a project as feature nodes of a force-directed graph in a visualization.

The machine-readable instructions further include sub-feature node connecting instructions 504 to connect, in the force-directed graph, sub-feature nodes representing sub-features associated by links to the feature nodes in the force-directed graph.

The machine-readable instructions further include sub-feature node size setting instructions 506 to set a size of each respective sub-feature node of the sub-feature nodes based on an amount of resource usage expended on a respective sub-feature represented by the respective sub-feature node.

The machine-readable instructions further include graph displaying instructions 508 to cause display of the force-directed graph, and force-directed graph changing instructions 510 to collapse or expand a portion of the force-directed graph responsive to user interaction with the force-directed graph.

Figure 6:
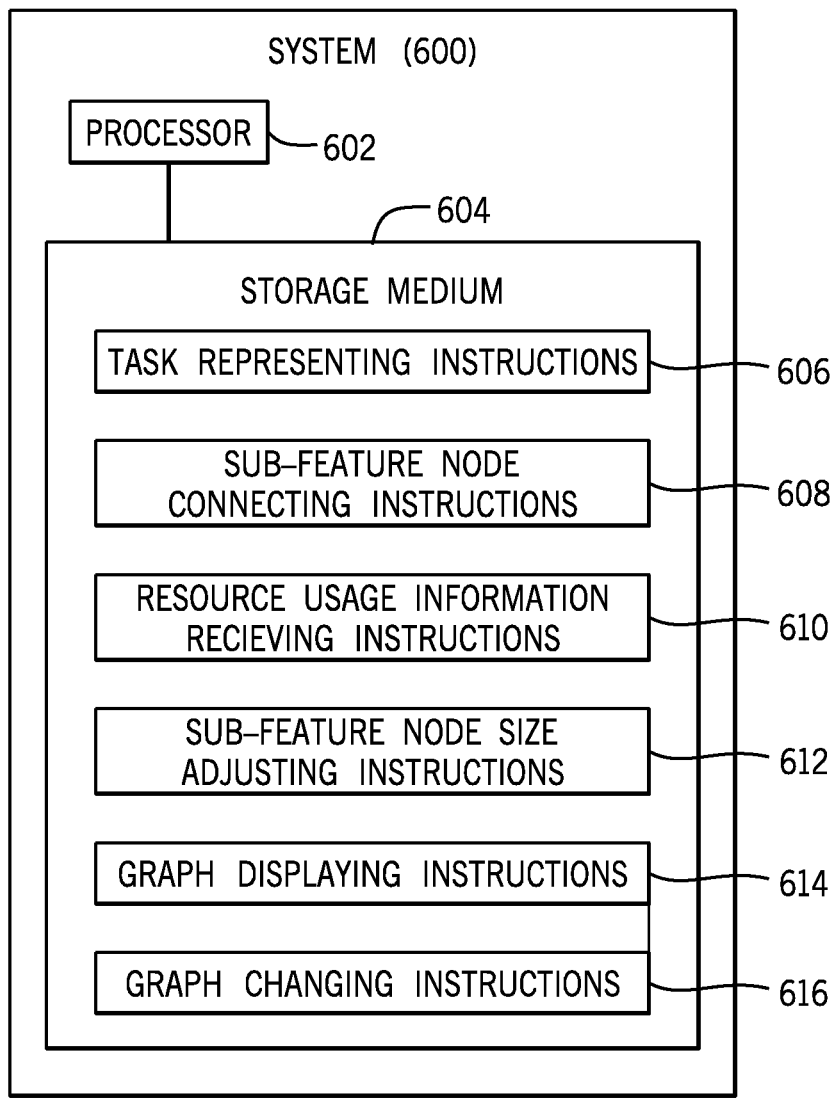
FIG. 6 is a block diagram of a system according to further examples.

FIG. 6 is a block diagram of a system 600 that includes a hardware processor 602 and a non-transitory storage medium 604 storing machine-readable instructions executable on the hardware processor 602 to perform various tasks. A hardware processor can include a microprocessor, a core of a multi-core microprocessor, a microcontroller, a programmable integrated circuit, a programmable gate array, or another hardware processing circuit. Machine-readable instructions executable on a hardware processor can refer to the instructions executable on a single hardware processor or the instructions executable on multiple hardware processors.

The machine-readable instructions include task representing instructions 606 to represent tasks of a project as feature nodes of a force-directed graph in a visualization. The machine-readable instructions further include sub-feature node connecting instructions 608 to connect, in the force-directed graph, sub-feature nodes representing sub-features associated by links to the feature nodes in the force-directed graph.

The machine-readable instructions further include resource usage information receiving instructions 610 to receive collected information regarding amounts of resource usage expended on respective sub-features represented by the sub-feature nodes.

The machine-readable instructions include sub-feature node size adjusting instructions 612 to adjust a size of each respective sub-feature node of the sub-feature nodes based on the collected information regarding amounts of resource usage. The machine-readable instructions include graph displaying instructions 614 to cause display of the force-directed graph. The machine-readable instructions include graph changing instructions 616 to change the force-directed graph responsive to user interaction with the force-directed graph.

Figure 7:
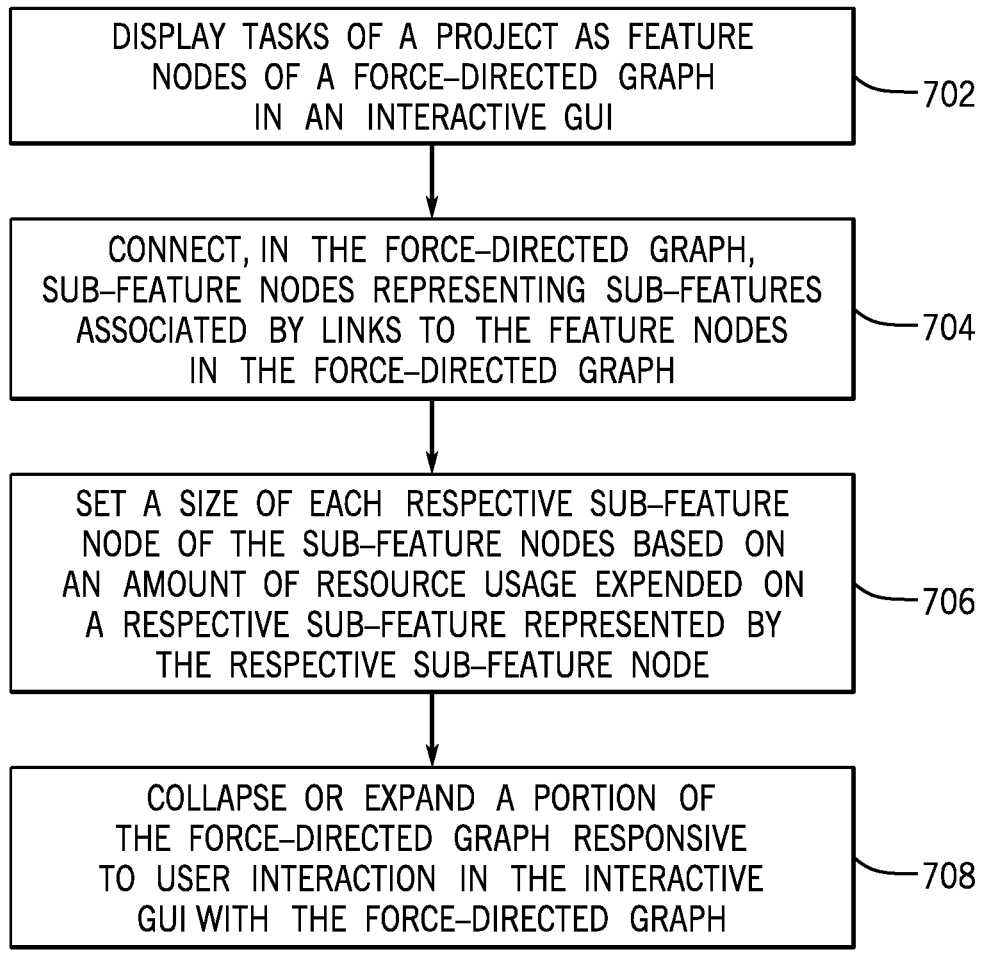
FIG. 7 is a flow diagram of a process according to some examples.

FIG. 7 is a flow diagram of a process according to some examples which can be performed by the system 100 of FIG. 1 or the system 600 of FIG. 6. The process includes displaying (at 702) tasks of a project as feature nodes of a force-directed graph in a visualization of an interactive GUI. The process further includes connecting (at 704), in the force-directed graph, sub-feature nodes representing sub-features associated by links to the feature nodes in the force-directed graph. The process includes setting (at 706) a size of each respective sub-feature node of the sub-feature nodes based on an amount of resource usage expended on a respective sub-feature represented by the respective sub-feature node.

The process further includes collapsing or expanding (at 708) a portion of the force-directed graph responsive to user interaction in the interactive GUI with the force-directed graph.

The storage medium 500 of FIG. 5 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
represent features of a project as feature nodes in a force-directed graph in a visualization;
represent sub-features associated with each feature as sub-feature nodes in the force-directed graph;
connect, in the force-directed graph, the sub-feature nodes representing the sub-features associated with each feature to the feature node that represents the feature;
determine an amount of resource usage expended on performing each sub-feature of the sub-features;
adjust a display size of each sub-feature node of the sub-feature nodes in the force-directed graph based on the amount of resource usage expended on performing the respective sub-feature represented by the sub-feature node;
cause a display of the force-directed graph that includes the feature nodes and the sub-feature nodes, wherein each sub-feature node is displayed with the adjusted display size;
adjust display distances between the feature nodes of the force-directed graph in the display to cause links between the feature nodes to have substantially equal lengths for improvements in the visualization of the features of the project
wherein the sub-feature nodes comprise a first sub-feature node representing a test performed in the project; and
assign a display color to the first sub-feature node based on a passed or failed status of the test performed in the project.

2. The non-transitory machine-readable storage medium of claim 1, wherein the first sub-feature node represents information of a defect in the project.

3. The non-transitory machine-readable storage medium of claim 1, wherein the instructions upon execution further cause the system to:
adjust display distances between the feature nodes of the force-directed graph in the display to cause a number of the links that cross each other to be reduced for improvements in the visualization of the features of the project.

4. The non-transitory machine-readable storage medium of claim 1, wherein the instructions upon execution further cause the system to:
collapse or expand a portion of the force-directed graph responsive to a user interaction with the force-directed graph.

5. The non-transitory machine-readable storage medium of claim 1, wherein the amount of resource usage expended on performing the respective sub-feature comprises at least one of an amount of a storage resource expended, or an amount of a communication resource expended.

6. The non-transitory machine-readable storage medium of claim 1, wherein the amount of resource usage expended on performing the respective sub-feature comprises a number of personnel hours expended by persons on performing the respective sub-feature.

7. The non-transitory machine-readable storage medium of claim 4, wherein the collapse of the portion of the force-directed graph combines the first feature node and first sub-feature nodes associated with the first feature node in the portion of the force-directed graph into a collapsed node.

8. The non-transitory machine-readable storage medium of claim 7, wherein the instructions upon execution further cause the system to set a display size of the collapsed node based on aggregating individual amounts of resource usage expended on performing first sub-features represented by the first sub-feature nodes combined into the collapsed node.

9. The non-transitory machine-readable storage medium of claim 4, wherein the expanding of the portion of the force-directed graph comprises providing an amplified view of the portion of the force-directed graph.

10. The non-transitory machine-readable storage medium of claim 1, wherein the instructions upon execution further cause the system to:
adjust resource allocation for management of the project based on user interaction with an interactive user interface displaying the force-directed graph.

11. The non-transitory machine-readable storage medium of claim 10, wherein the management of the project comprises developing a machine, developing a program, or managing an information technology infrastructure.

12. The non-transitory machine-readable storage medium of claim 10, wherein the management of the project comprises deploying a fix for a fault or error of a machine or program of an information technology infrastructure.

13. A system, comprising:
a processor; and
a non-transitory storage medium storing instructions executable on the processor to:
represent features of a project as feature nodes in a force-directed graph in a visualization;
represent sub-features associated with each feature as sub-feature nodes in the force-directed graph;
connect, in the force-directed graph, the sub-feature nodes representing the sub-features associated with each feature to the feature node that represents the feature;
determine amounts of resource usage expended on performing the sub-features represented by the sub-feature nodes;
adjust a display size of each sub-feature node of the sub-feature nodes in the force-directed graph based on the amounts of resource usage;
cause a display of the force-directed graph that includes the feature nodes and the sub-feature nodes, wherein each sub-feature node is displayed with the adjusted display size;
adjust display distances between the feature nodes of the force-directed graph in the display to cause links between the feature nodes to have substantially equal lengths for improvements in the visualization of the features of the project
wherein the sub-feature nodes comprise a first sub-feature node representing a test performed in the project; and
assign a display color to the first sub-feature node based on a passed or failed status of the test performed in the project.

14. The system of claim 13, wherein the instructions are executable on the processor to further:
collapse a portion of the force-directed graph responsive to a user interaction with the force-directed graph, wherein the collapse of the portion of the force-directed graph combines the first feature node and first sub-feature nodes associated with the first feature node in the portion of the force-directed graph into a collapsed node.

15. The system of claim 13, wherein the instructions are executable on the processor to further:

adjust display distances between the feature nodes of the force-directed graph in the display to cause a number of the links that cross each other to be reduced for improvements in the visualization of the features of the project.

16. A method executed by a system comprising a hardware processor, comprising:

representing features of a project as feature nodes in a force-directed graph in a visualization of an interactive graphical user interface (GUI);

representing sub-features associated with each feature as sub-feature nodes in the force-directed graph;

connecting, in the force-directed graph, the sub-feature nodes representing the sub-features associated with each feature to the feature node that represents the feature;

determining an amount of resource usage expended on performing each sub-feature of the sub-features;

adjusting a display size of each sub-feature node of the sub-feature nodes in the force-directed graph based on the amount of resource usage expended on performing the respective sub-feature represented by the sub-feature node;

causing a display of the force-directed graph that includes the feature nodes and the sub-feature nodes, wherein each sub-feature node is displayed with the adjusted display size; and adjusting display distances between the feature nodes of the force-directed graph in the interactive GUI to cause links between the feature nodes to have substantially equal lengths for improvements in the visualization of the features of the project wherein the sub-feature nodes comprise a first sub-feature node representing a test performed in the project, and assigning a display color to the first sub-feature node based on a passed or failed status of the test performed in the project.

17. The method of claim 16, further comprising:

collapsing a portion of the force-directed graph responsive to user interaction in the interactive GUI with the force-directed graph, comprising combining the first feature node and first sub-feature nodes associated with the first feature node in the portion of the force-directed graph into a collapsed node.

18. The method of claim 16, further comprising:

adjusting display distances between the feature nodes of the force-directed graph in the interactive GUI to cause a number of the links that cross each other to be reduced for improvements in the visualization of the features of the project.

\* \* \* \* \*